Patented Aug. 7, 1945

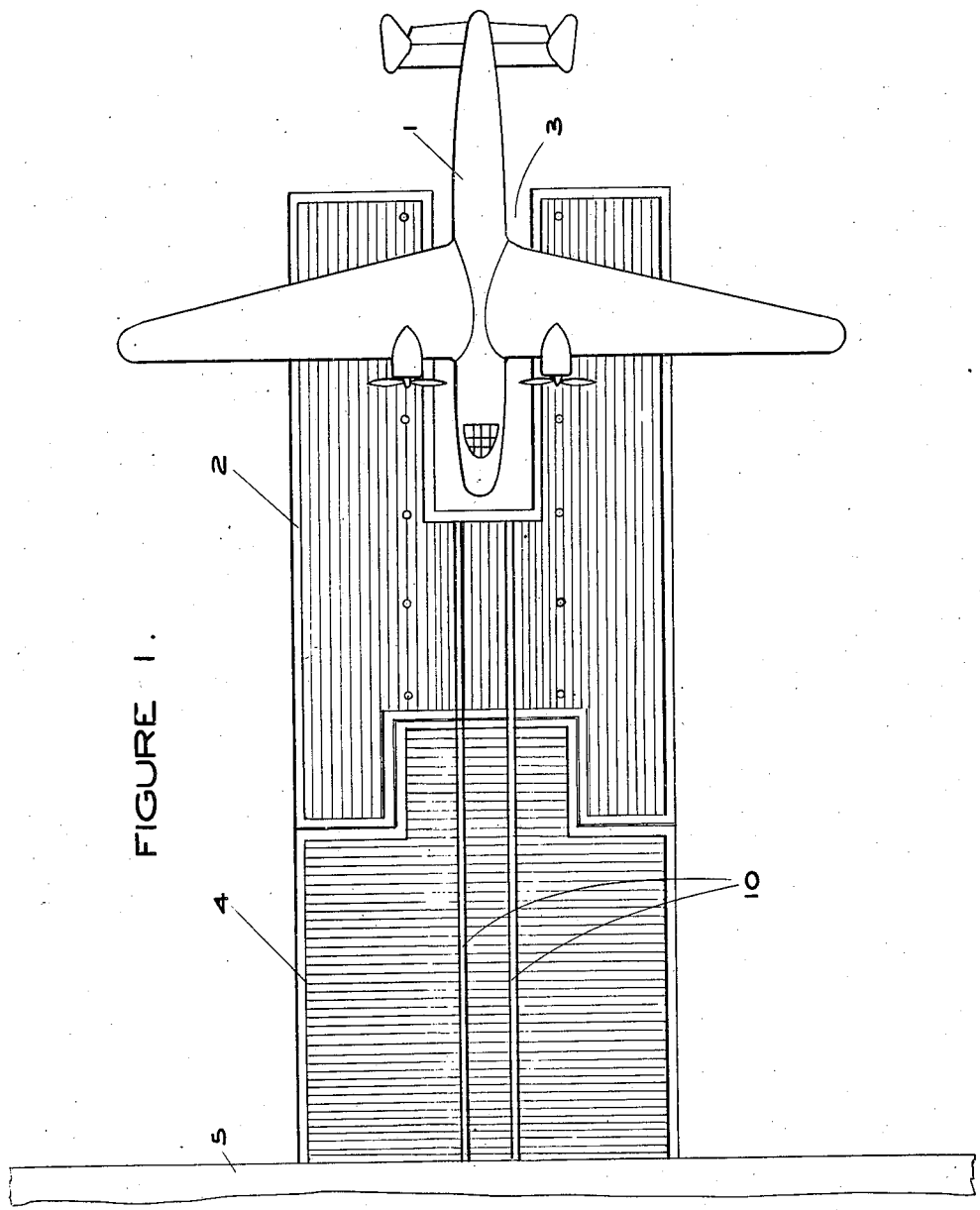

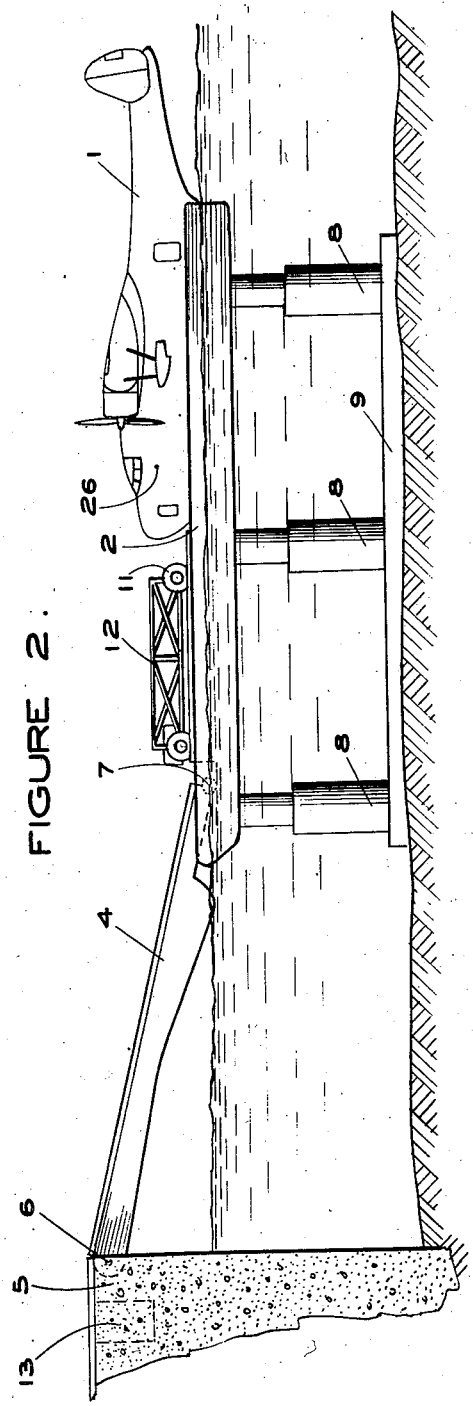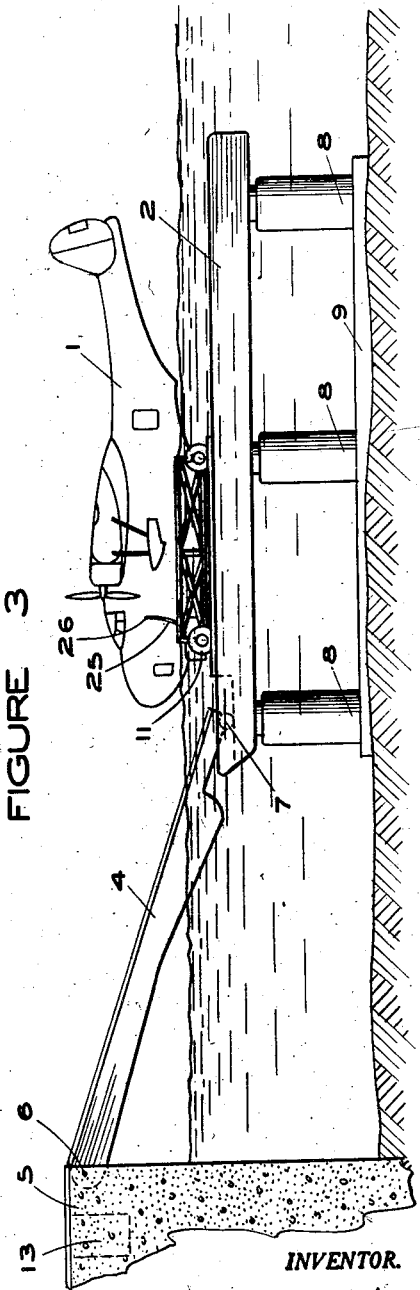

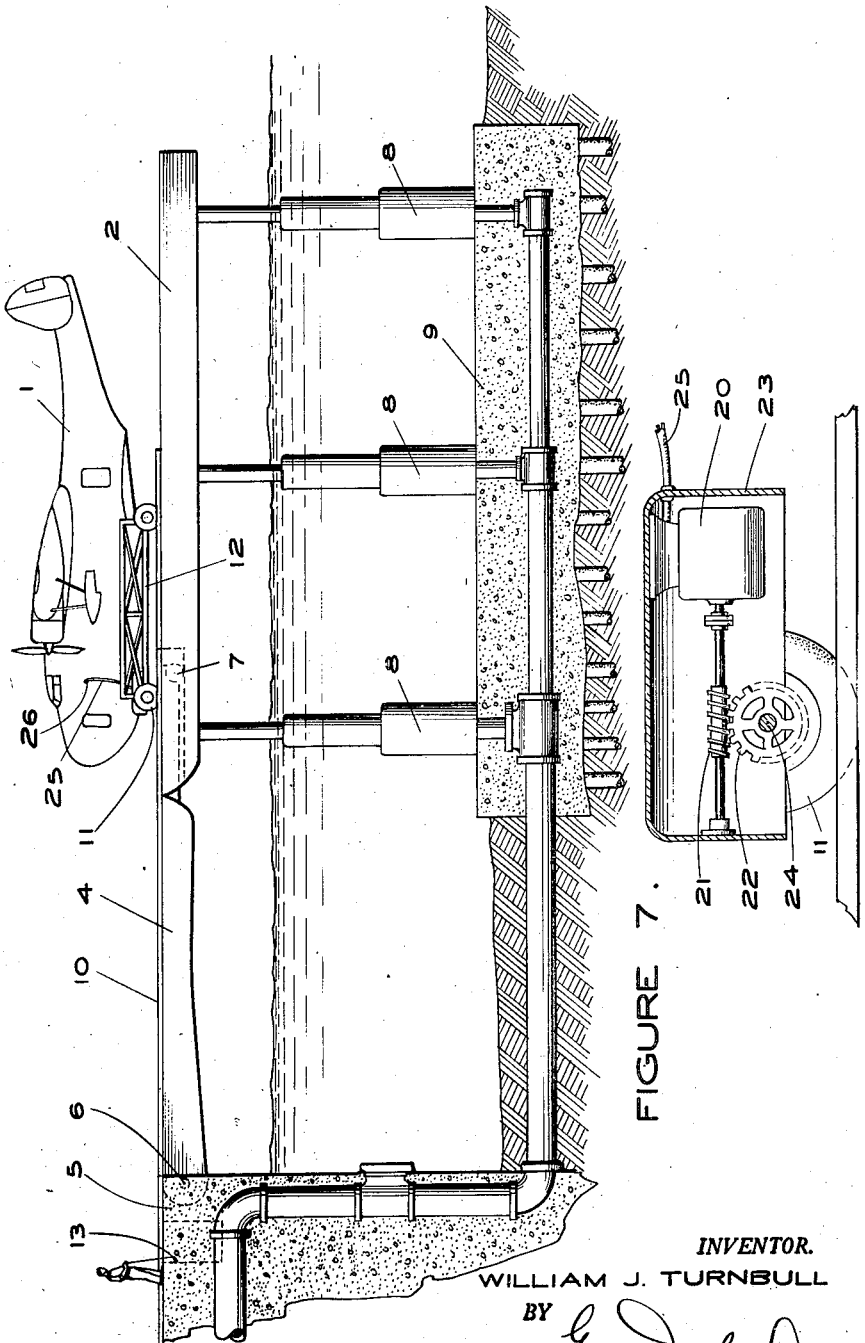

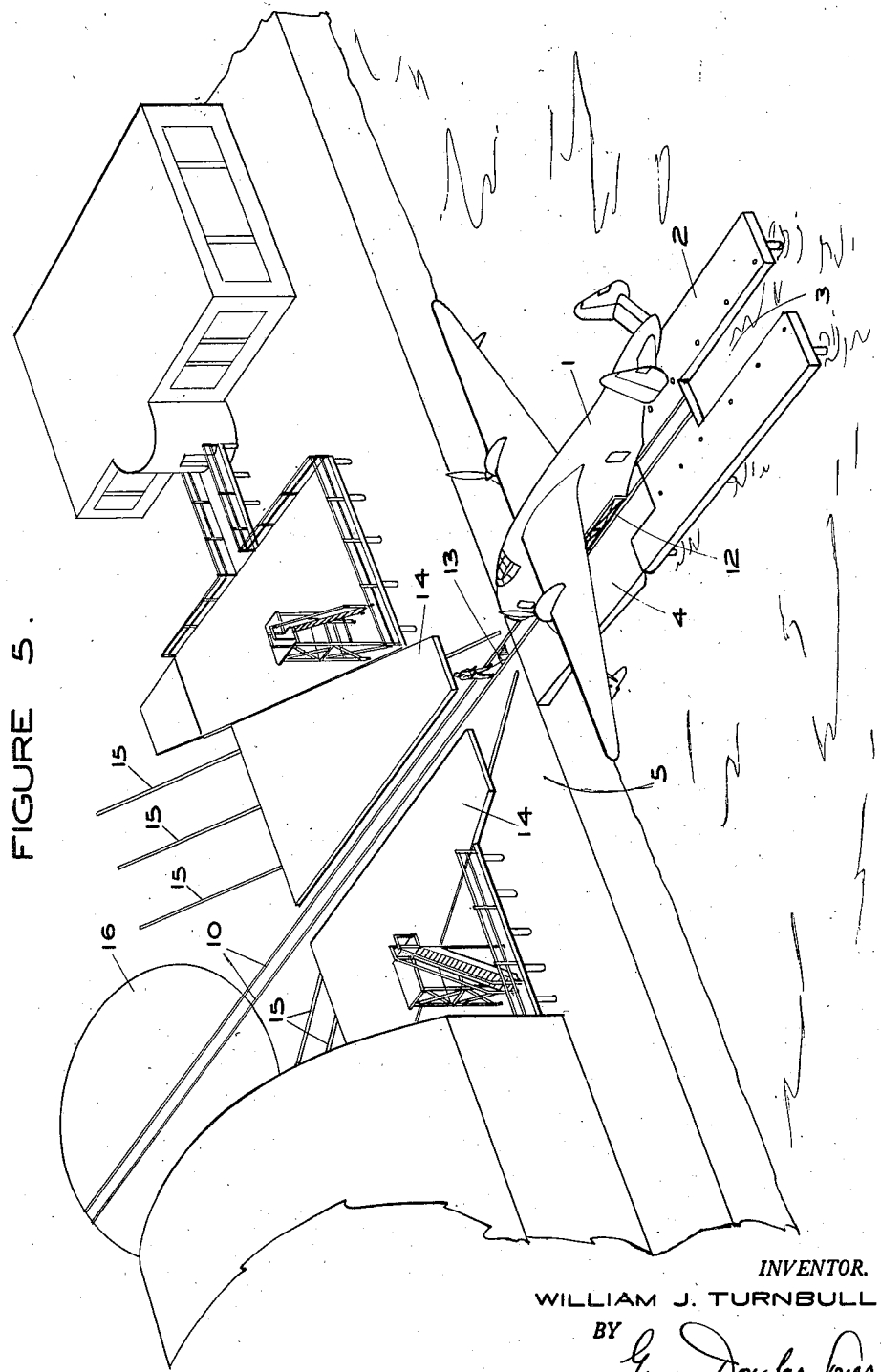

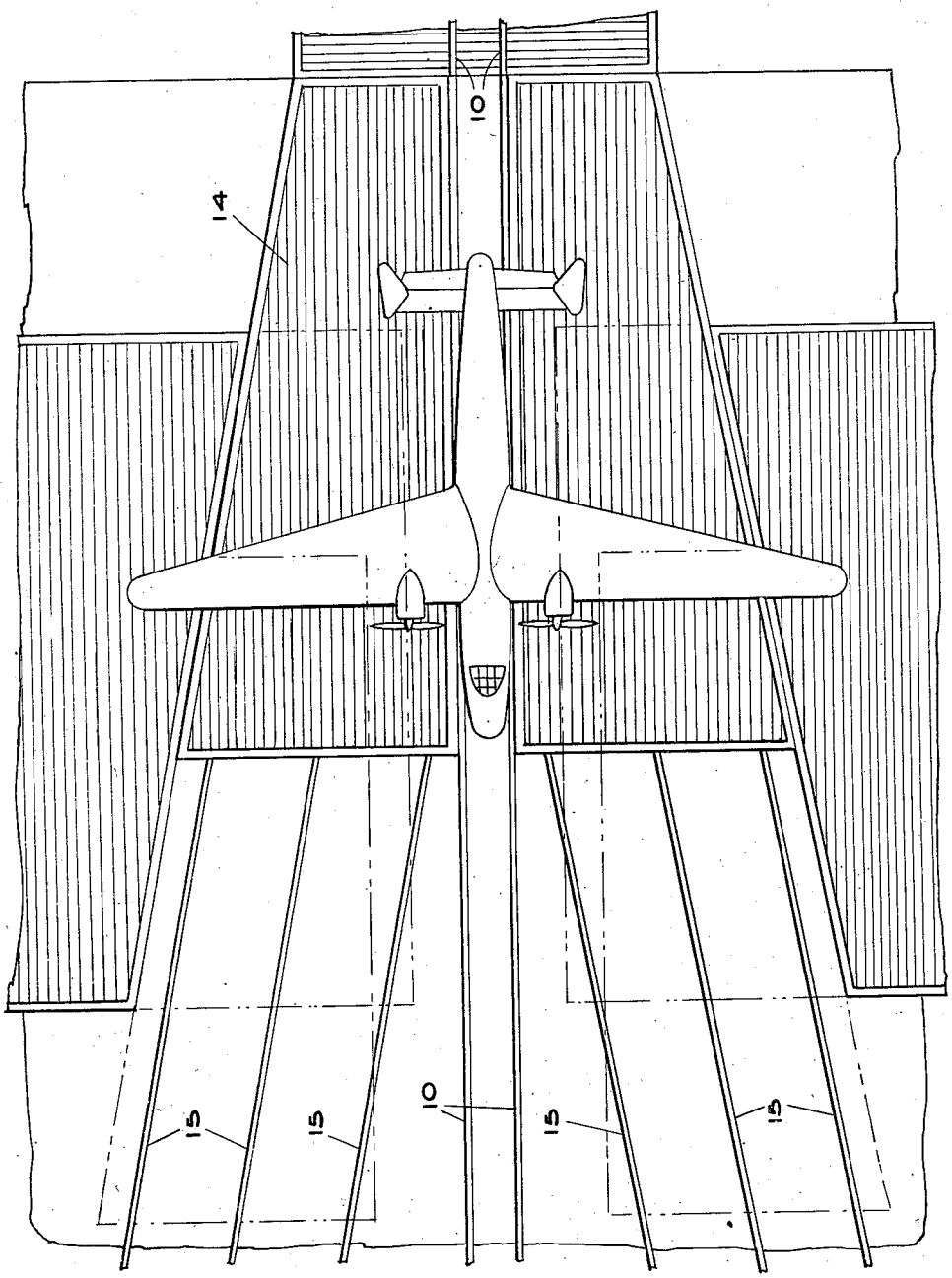

2,381,789

UNITED STATES PATENT OFFICE 2,381,789

SEAPLANE DOCKING

William J. Turnbull, Towson, Md., assignor to The Glenn L. Martin Company, Middle River, Md., a corporation of Maryland Application March 3, 1944, Serial No. 524,965

3 Claims. (Cl. 61—48)

This invention relates to the general arrangement of structure to facilitate docking, launching, loading and unloading seaplanes.

Seaplanes of the size and type illustrated in the drawings can land and take off in relatively rough water but due to the inherent structural limitations in designs of hulls of such craft, extreme care must be employed in handling such craft when docking. In still water they may be brought up and tied to a dock or float without much danger of tearing or scraping the skin. But if the water is at all rough, the difficulty increases in docking, loading and unloading the seaplane. For these reasons it is desirable to take the seaplane ashore for loading and unloading and servicing.

By this invention a simple and practical structure is employed to transport a seaplane from a position afloat at a dock, to one ashore where it may be loaded and unloaded, effecting a saving in time and man-power.

Another object of this invention is to provide a dock that will receive a seaplane in still water for loading and unloading or which may be submerged and a beaching carriage placed under the seaplane afloat, for transporting the seaplane ashore.

A further object is the provision of tracks or guides for the carriage to convey the seaplane to convenient loading platforms ashore.

Further and other objects will become apparent from the description of the accompanying drawings which form a part of this disclosure and in which like numerals refer to like parts.

In the drawings:

Figure 1 shows a plan view of the seaplane berthed in a floating dock.

Figure 2 is a side elevational view of the same.

Figure 3 is a side elevational view showing the dock submerged.

Figure 4 shows a side elevational view of the dock in the elevated position.

Figure 5 is a perspective view of the dock and related handling and servicing equipment.

Figure 6 is a plan view of the seaplane ashore along side the loading platforms.

Figure 7 is a fragmentary view, partially in section, showing the wheel drive.

In the drawings, Figure 1 shows a seaplane 1 adjacent a dock 2 having a cutout portion or slip 3, in which the seaplane may be berthed. Ramp 4 has one end secured by hinge 6 to shore structure 5, the other end being supported on the dock. Certain features of this arangement will be clearer from a consideration of Figure 2 which shows ramp 4 hinged at 6 to shore structure 5 and the sliding engagement of the other end of the ramp and the dock by means of wheel 7.

While dock 2 may be of a structure that will normally float in water, it will be supported by hydraulic or pneumatic jacks 8 secured in a suitable foundation 9. Tracks 10 extend from the slip at the dock, over the ramp and shore structure 5. These tracks may be suitably formed to accommodate the wheels 11 of beaching carriage 12. The beaching gear may be dirigible and not rely upon tracks for guidance. The wheels 11 have pneumatic tires. The tracks consist of channels to guide the wheels of the carriage ashore, or if dual pneumatic tires are used, the tracks may consist of a single rail which the dual tires straddle. A drive on one or both sets of wheels may be employed such as that shown in Figure 7, in which an electric motor 20 drives the axle 24 of wheels 11 of the carriage by a worm 21 and gear 22. The inverted bell structure 23 affords some protection against submerging this equipment. A water proof cable 25 leading to the water may be plugged to a suitable outlet 26 in the side of the seaplane and the motors driven by the ships electric power plant and controlled by the pilot or any other suitable power source may be employed.

Figures 2, 3 and 4 show the operation of the dock in beaching the seaplane. In Figure 2, the seaplane is shown afloat in the slip in the dock. As pointed out above, in some instances this may provide suitable facilities for loading, unloading and servicing the craft in still water. If it is desirable to take the seaplane ashore, the dock may be submerged by hydraulic jacks 8 as shown in Figure 3, and the seaplane maneuvered over the beaching carriage 12. This carriage is so constructed that when properly positioned with respect to the hull of the ship, it engages and supports the hull at points where there are major structural members. So that when the hydraulic jacks are extended to elevate the dock to the position shown in Figure 4, the hull of the seaplane is properly supported. The actuation of the dock is controlled from a shore station generally indicated as 13. From this position an operator has full view and command of the beaching crew assisting in installing the beaching carriage with respect to the hull. When the airplane has been elevated by the hydraulic system, to the position shown in Figure 4, the pilot may, through the control of the driving wheels on the carriage, move the airplane ashore.

Figure 5 clearly illustrates the relationship of the dock structure to the shore structure and shows the tracks on which the carriage moves extending to the shore from the dock. Wedged shaped platforms 14 are mounted on wheels that are adapted to move on tracks 15. By these wedged shaped platforms, it can readily be seen that as the seaplane is brought ashore to a position between the moving platforms 14, these platforms may be moved adjacent the sides of the hull to facilitate loading and unloading and servicing the airplane. The separation between these moving platforms can be increased or decreased to accommodate any width flying boat hull. When the airplane is ready for take-off, it may be moved past the platforms to turn table 16 so that the plane may enter the water, when the dock is lowered, heading off shore so that it may proceed under its own power.

From a consideration of Figure 4, it will be obvious that the docking arrangement may be so constructed that very little power will be necessary to move the carriage ashore so that it is entirely feasible to move the seaplane by power supplied from its own power plant. By adjusting dock 2 with the hydraulic system, the grades may be adjusted so that gravity will aid in moving the seaplane and carriage along the track.

The wedged shaped loading or servicing platform eliminates ladders and gangways and the inherent accompanying hazards. The height of the platform and the proximity to the access opening in the hull will be such that passengers will step ashore onto a firm foundation and cargo will be placed ashore with equal facility.

It is to be understood that certain changes, alterations, modifications and substitutions can be made without departing from the spirit and scope of the appended claims.

I claim as my invention:

1. A docking device for seaplanes, comprising a shore structure, a platform positioned offshore, means to submerge and elevate said platform relative to the surface of the water, said platform being cut-out to afford a dock when at water level for a seaplane afloat, and a ramp on one end pivoted at the shore structure and the other end connected to the platform.

2. A seaplane dock comprising a shore structure, a platform positioned off shore, means to submerge and elevate said platform relative to the surface of the water, a ramp having one end pivoted on the shore structure and the other end adapted to rest on the platform, rails on said shore structure, ramp, and platform forming a continuous track when said platform is elevated to the plane of the shore structure, a wheeled cradle adapted to be moved on said track, whereby, when said cradle is placed under the hull of the seaplane with the platform submerged, the seaplane may be supported while the platform is elevated to the plane of the shore structure and the seaplane moved ashore.

3. A seaplane dock comprising a shore structure, a platform positioned off shore adapted to be submerged and elevated relative to the surface of the water, a ramp having one end pivoted on the shore structure and the other end adapted to rest on the platform, rails on said shore structure, ramp, and platform forming continuous track, a wheeled cradle adapted to be moved on said track, said cradle being formed to engage and support a seaplane hull for beaching and launching, means to elevate or depress said platform above or below the level of the shore structure to incline said ramp at a slight angle so that gravity may assist the movement of the cradle in beaching and launching the seaplane.

WILLIAM J. TURNBULL.